(12) United States Patent
Clasen et al.

(10) Patent No.: US 6,667,259 B2
(45) Date of Patent: Dec. 23, 2003

(54) OPTICAL COLORED GLASS, ITS USE, AND AN OPTICAL LONG-PASS CUTOFF FILTER

(75) Inventors: Rolf Clasen, Saarbrücken (DE); Monika Gierke, Wiesbaden-Erbenheim (DE); Jochen Freund, Mainz (DE); Simone Ritter, Mainz (DE); Uwe Kolberg, Mainz-Kastel (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 10/224,090

(22) Filed: Aug. 20, 2002

(65) Prior Publication Data

US 2003/0158029 A1 Aug. 21, 2003

(30) Foreign Application Priority Data

Aug. 22, 2001 (DE) .......................................... 101 41 104

(51) Int. Cl.[7] .......................... C03C 3/115; C03C 3/089; C03C 3/064; C03C 3/066
(52) U.S. Cl. ............................ 501/58; 501/65; 501/77; 501/79; 501/59; 501/67; 501/900
(58) Field of Search ................................ 501/40, 55–79

(56) References Cited

U.S. PATENT DOCUMENTS 4,106,946 A    8/1978   Ritze ........................... 106/52

FOREIGN PATENT DOCUMENTS

| DE | 26 21 741 | 10/1978 |
|----|-----------|---------|
| RU | 1527199   | 12/1989 |
| RU | 1675239   | 9/1991  |
| RU | 1675240   | 9/1991  |
| RU | 1677025   | 9/1991  |
| RU | 1677026   | 9/1991  |
| RU | 1678785   | 9/1991  |
| RU | 1678786   | 9/1991  |
| RU | 1701658   | 12/1991 |
| RU | 1770297   | 10/1992 |
| RU | 1770298   | 10/1992 |
| RU | 1787963   | 1/1993  |
| RU | 2073657   | 2/1997  |

Primary Examiner—David Sample
Assistant Examiner—Elizabeth A Bolden
(74) Attorney, Agent, or Firm—Baker & Daniels

(57) ABSTRACT

An optical colored glass with a composition (in percent by weight based on oxide) of $SiO_2$ 30–75; $K_2O$ 5–35; $TiO_2$ 0–5; $B_2O_3 > 4$–17; ZnO 5–37; F 0.01–10 $M^I M^{III} Y_2^{II}$ 0.1–3, whereby $M^I = Cu^+$, $Ag^+$, $M^{III} = In^{3+}$, $Ga^{3+}$, $Al^{3+}$, $Y^{II} = S^{2-}$, $Se^{2-}$, $Te^{2-}$, as well as the use of this glass as a long-pass cutoff filter.

19 Claims, No Drawings

OPTICAL COLORED GLASS, ITS USE, AND AN OPTICAL LONG-PASS CUTOFF FILTER

The subject matter of the invention is an optical colored glass, it use, as well as an optical long-pass cutoff filter.

Optical long-pass cutoff filters are distinguished by characteristic transmission properties. In the short-wave range, they have a lower transmission, which increases to a higher transmission over a narrow spectral range and remains high in the long-wave range. The lower transmission range is called the stop band, and the higher transmission range is called the pass band or the transmission band.

Optical long-pass cutoff filters are characterized by certain parameters. For example, the absorption edge of such a filter is generally given as the so-called edge wavelength $\square_c$. It corresponds to the wavelength at which the spectral internal transmission factor between the stop band and the transmission band equals half of the maximum value.

Optical long-pass cutoff filters are generally made of colored glass, in which the coloring is caused by the colloidal precipitation of semiconductor compounds during the cooling of the melt or by the later heat treatment. This is also sometimes called starting glass.

The long-pass cutoff filters that are customary in the marketplace are produced by a doping of the base glass with cadmium-semiconductor compounds or raw materials that form in situ the named compounds. Depending on the edge position, CdS, CdSe, CdTe, or a mixed combination of these semiconductors is used. Based on the toxic and carcinogenic properties of the cadmium and the tellurium, it is desirable to be able to avoid these compounds and use other dopants instead. In order to obtain the same or similar glass absorption properties, alternative dopants must also be made of semiconductors or raw materials, which form semiconductors in situ, with direct optical transitions. The sharp transitions between the absorption and transmission range of the glass and, thus, the filter properties of the glass are only determined by the special band structure of the semiconductor, the energy gap between the valence band and the conduction band.

The I-III-VI semiconductor system, e.g., copper indium disulfide and copper indium diselenide, could also represent an alternative to the CdS, CdSe, CdTe compounds.

These long-known semiconductors have only had much practical meaning in the field of photovoltaics.

In a series of Russian and Soviet patent applications, $CuInS_2$-doped glass to be used as a filter is already described for a very narrow glass composition range: SU 1677026A1, SU 1527199A1, RU 2073657C1, SU 1770297A1, SU 1770298A1, SU 1678786A1, SU 1678785A1, SU 1701658A1, SU 1677025, SU 1675239A1, SU 1675240A1, and SU 1787963A 1. All of this glass is similar in that they all contain large amounts of $SiO_2$ at rates of up to 79 percent by weight. Thus, it is necessary to produce the glass at very high temperatures of approx. 1400° C. to 1500° C., which is particularly disadvantageous due to the highly volatile and oxidation-sensitive doping agent. According to synthesis, this type of glass contains large amounts of this compound, with up to 0.99 percent by weight of $CuInS_2$. This type of glass is $B_2O_3$-free or -poor. It does not have good chemical resistance.

The purpose of the invention is to make available optical chemically resistant colored glass, which possesses long-pass cutoff filter properties, that can be produced at low temperatures and, thus, energy-efficiently and that has absorption edges up to 1.2 µm.

It is also the purpose of the invention to make such long-pass cutoff filters available.

The purposes are fulfilled through a glass in accordance with the following composition by weight percentage:

$SiO_2$ 30–75
$K_2O$ 5–35
$B_2O_3$ >4–17
$ZnO$ 5–37
F 0.01–10
$M^I M^{III} Y^{II}_2$, whereby $M^I$=$Cu^+$, $Ag^+$ 0.1–3
$M^{III}$=$In^{3+}$, $Ga^{3+}$, $Al^{3+}$ $Y^{II}$=$S^{2-}$, $Se^{2-}$.
$Te^{2-}$.

The purposes are further fulfilled through use of the glass as an optical long-pass cutoff filter.

With 30 to 75 percent by weight, preferably 40 to 65 percent by weight, and most preferably 40 to 56 percent by weight, $SiO_2$ is the main component of the glass.

The glass based on the invention has a $B_2O_3$ content between >4 and 17 percent by weight. This improves the chemical resistance as well as the processability and drying of the green body during production via a sintering process. Contents higher than 17 percent by weight would have a disadvantageous affect on the glass quality. Moreover, the solubility of $H_3BO_3$ in $H_2O$, a possible raw material for the boroxide, is limited to the named $B_2O_3$ content. Contents between 5 percent by weight and 16 percent by weight are preferred. Particularly preferred is a $B_2O_3$ content of at least 8 percent by weight.

The $H_3BO_3$ raw material is particularly advantageous when $K_2O$ is brought in as a component of the glass via the raw material KOH, since the very high pH value of the suspension, caused by the KOH, is lowered when the sintering process is used.

An important component is ZnO. This oxide is present at 5 to 37 percent by weight. ZnO supports homogenous nanocrystal formation of the doping material in the glass. This means that, a homogenous crystallite growth of the semiconductor doping is ensured with the tempering of the glass. The very pure and bright color and the sharp absorption edge of the glass are the result of these monodispersive crystallites. At a ZnO content lower than 5 percent by weight, the glass displays poor or no starting behavior. The named upper limit for ZnO is meaningful, since glass that has a higher content of ZnO has a tendency to form drop-like areas of precipitation and, thus, to segregate. A ZnO share of at least 5 percent by weight is preferred, especially preferred from at least 9 percent by weight and a ZnO share of at the most 30 percent by weight especially preferred from at the most 23 by weight. The segregation tendency of this type of "zinc silicate glass" can be lowered by the use of the $K_2O$ network converter. Thus, the glass contains 5 to 35 percent by weight, preferably 15 to 29 percent by weight in order to prevent micro-dispersions of ZnO-enriched areas and to reduce their processing temperature. In particular, with a ZnO content >5 percent by weight, a $K_2O$ content >5 percent by weight is preferred, and, with a ZnO content >10 percent by weight, a $K_2O$ content >17 percent by weight is preferred. Highly transparent glass is obtained in this manner.

It is also possible to further improve the starting properties of the glass by adding the additional crystal creators CdS and CdSe. The content of CdS and CdSe should not exceed individually and in total 0.5 percent by weight. Based on the toxic properties of these components, it is preferable to avoid them; Cd-free glass is preferred.

Furthermore, the glass also contains between 0.01 and 10 percent by weight of F. This is especially advantageous if the glass is produced via sintering processes, since the sinter temperature is reduced by the F shares and the strength of the green bodies is increased. At least 0.3 percentage by weight is particularly preferred. More than 3 percent by weight is even more preferred, since this improves the bubble quality of the glass produced via the sintering process. During production via a melting process, the presence of F reduces the melting temperature.

A high strength of the green body is significant for its processing, its transport, and its handling. The strength of the green bodies is determined in that hydrogen bonds form between the neighboring SiOH groups and thus interlace the green bodies. If F is present, besides the hydrogen bonds, bonds also form between —SiF and —SiOH that are stronger than the hydrogen bonds between —SiOH and —SiOH. Low amounts of fluorine can thus increase the strength. However, the drying properties of the green body are impaired when the F content is too high (>10 percent by weight). Moreover, the expansion factor becomes too high and the transformation temperature, too low. F concentrations <5 percent by weight are preferred.

As doping agent for conferring of the filter properties, the glass contains 0.1–3 percent by weight of the ternare semiconductor systems $M^{I}M^{III}Y^{II}_{2}$ (with $M^{I}=Cu^+$, $Ag^+$, $M^{III}=In^{3+}$, $Ga^{3+}$, $Al^{3+}$, $Y^{II}=S^{2-}$, $Se^{2-}$, $Te^{2-}$), preferably, in particular, when production takes place via a sintering process, up to 1 percent by weight, more preferably 0.1 to 0.3 percent by weight, and most preferably 0.1 to 0.25 percent by weight. It is preferred that $M^{I}M^{III}Y^{II}_{2}$ consists of $M^{I}=Cu^+$ and/or $Ag^+$, $M^{III}=In^{3+}$, and/or $Ga^{3+}$, $Y^{II}=S^{2-}$ and/or $Se^{2-}$. Most preferred are doping substances from one or more components from the CuIn $(Se_{1-x}S_{x})_2$ system with x=0 to 1, i.e., from the boundary components $CuInSe_2$ and $CuInS_2$ as well as from their mixed compounds.

Through variations in the portions of each of the compounds, the absorption edge can be shifted in the range from 360 nm to 1200 nm. For contents between 0.1 and 0.25 percent by weight of doping substances, edge positions between 550 nm and 1060 nm are attainable.

The glass can also contain up to 20 percent by weight of $Na_2O$, up to 20 percent by weight of MgO, up to 20 percent by weight of CaO, with CaO+MgO up to 20 percent by weight, up to 10 percent by weight of $Al_2O_3$ and up to 5 percent by weight of $TiO_2$.

Just like $K_2O$, $Na_2O$ takes over the functions of the network converter and mainly controls the physical properties like viscosity fix points and the expansion factor. But, a higher $Na_2O$ share is not advisable, since this has a negative effect on the expansion factor and makes the glass very short. The total of $K_2O$ and $Na_2O$ should not exceed 35 percent by weight. Preferably, it does not exceed 29 percent by weight. The other expensive alkaline oxides $Li_2O$, $Rb_2O$, and $Cs_2O$ can generally be used, but are not preferred based on their price disadvantage.

MgO is also a network converter as well as a stabilizer. MgO represses the devitrification ability. Above the given limit, MgO impedes the sintering behavior and the purification.

CaO functions as a network converter and increases the chemical resistance of the glass. But, CaO is negative for the devitrification and should thus not exceed 20 percent by weight, preferably 10 percent by weight.

Above all, in this glass system, the $TiO_2$ components take on the function of supportive UV blocking. In the stop band, long-pass cutoff filters must fulfill an optical density of at least 3. This can be supported by additional UV absorbers like $TiO_2$. Moreover, the glass becomes harder through $TiO_2$, and the acid resistance increases. But, too much $TiO_2$ reduces the alkaline strength of the glass, and the maximum share of $TiO_2$ should therefore not exceed 5 percent by weight.

$Al_2O_3$ is a network converter as well as a network builder and stabilizes the glass mechanically and chemically. But, a share that is too high leads to an expansion factor decrease that is too strong or to melting temperatures that are too high. Preferably, no more than 5 percent by weight of $Al_2O_3$ should be used.

Furthermore, the glass can contain up to <10 percent by weight of SrO and up to <10 percent by weight of BaO for fine-tuning of the expansion factor, the transformation temperature and the processing temperature. SrO and BaO are similar to MgO and CaO in many respects, but are more expensive. Thus, they are used in a more limited fashion. Shares between 0 and <5 percent by weight are particularly preferred.

But it should be noted that, when using larger amounts of alkaline earth oxides, only a small amount of F should be used, since otherwise $MF_2$-type (M=Mg, Ca, Sr, Ba) crystals form. Thus, it is preferred that, in glass, in which the F content is between 1 and 10 percent by weight, the content of alkaline earth oxides (MgO+CaO+SrO+BaO) is limited to <3 percent by weight, preferably to $\leq 1$ percent by weight or that the glass is free of alkaline earth oxides, and that, in glass, in which the content of MgO+CaO+SrO+BaO is $\geq 3$ percent by weight, the content of F is limited to <1 percent by weight. Preferably, the content of F already in glass, in which the alkaline earth oxide content is >1 percent by weight, is limited to <1 percent by weight. The glass can contain common purification substances in usual amounts. Moreover, the glass can contain up to 10 percent by weight of $P_2O_5$, up to 5 percent by weight of $CeO_2$, up to 5 percent by weight of $ZrO_2$, up to 5 percent by weight of $La_2O_3$, and up to 5 percent by weight of $Ta_2O_5$.

The glass can contain common purification substances in common amounts.

Purification substances include all components that give off or evaporate gas in the temperature range, given by the process, through redox reactions. Purification substances that, in addition to the purification effect, have a positive influence on the coloration as a result of the intervention to the redox process are preferred. Redox aids are, e.g., $As_2O_3$, $Sb_2O_3$, $As_2S_3$, and $Sb2S_3$.

The glass can be melted using the common vitrification process for the known starting glass, i.e., under neutral or reducing conditions at temperatures of approx. 1100–1500° C. Already during the cooling process or through a later temperature treatment, the glass forms finely divided nanocrystallites that cause the color or the starting of the glass.

It is advantageous that glass can also be produced with the help of a sintering process, i.e., based on a powder-technological method: in this method, a green body consisting of a powdered $SiO_2$ or $SiO_2$-suspension, which can be sintered, is created. For temperature reduction of the sintering process and for the matching of the glass properties, additional additives are used in addition to the powdered $SiO_2$ or $SiO_2$-suspension, whereby, however, no alcohol solvents are necessary. So that the green body can be well sintered, soluble raw materials or raw materials with a particle diameter of preferably <0.5 $\mu$m, even more preferably <100 nm (=nano-scaled), should be used.

Boric acid, zinc oxide, calcium carbonate, caustic potash solution, and other compounds that possess network formers and converters are used as raw materials for additives. The additives can also be any other type of carbonate, caustic solution, or bases like soda lye or potassium hydrogen fluoride. Moreover, dispersion aids like ammonium fluoride, other caustic solutions, and acids like sulfuric acid or phosphoric acid can also be added. Since these chemicals are also offered as standards in analytical purity, with the help of this procedure, highly pure glass can be obtained, whereby the level of purity of the glass depends on the pollutants in the additional glass components.

The green body is produced by dispersing and dissolving the source materials in water or, optionally, in an alcohol solvent like ethanol.

In this process, at least one dopant is dispersed together with the source materials.

The dissolving and dispersing of the source materials advantageously follows intensive doping materials for producing a green body such that a pourable or spreadable or extrudable suspension forms. After the hardening of the suspension at room temperature or temperatures up to preferably 100° C., the green body is dried at room temperature or at temperatures up to 400° C. The dried green body will finally be sintered or melted at temperatures between 600° C. and 1100° C., depending on the glass composition. Optionally, in order to improve the homogeneity and the final quality of the resulting glass, the green body can once again be ground or ground, then dispersed and dried.

In the below examples, KOH, $H_3BO_3$, ZnO, $KHF_2$, $SiO_2$ are used as source materials, and $CuInSe_2$ or $CuInS_2$ are used as the dopant.

The source materials KOH, $H_3BO_3$, ZnO, $KHF_2$, $CuInSe_2$, or $CuInS_2$ as well as $SiO_2$ are dissolved or dispersed in water by stirring. Optionally, the stirring in of the raw materials can also take place with the aid of ultrasound or with the use of additives to the suspension, in order to ease the dispersing or dissolving of the different raw materials.

The final suspension is poured into a casting mould, in which it hardens, and air-dries for 1–96 hours. It can also be painted or extruded into the casting mould. After removal from the mould, the green body is dried for another 1 to 96 hours at room temperature and subsequently 1 to 48 hours at 40 to 400° C.

The sintering to the glass occurs at temperatures between 600 and 1200° C., depending on the composition of the glass. Holding times are generally between 10 minutes and 5 hours. The later start-up process for the formation of the semiconductor crystallite is performed at 400 to 700° C., whereby holding times between 5 and 500 hours, preferably between 5 and 100 hours, are used.

Glass produced based on the two-step procedure with the help of a sintering process can be produced at temperatures that lie approx. 200 to 700° C. below the production temperature of the glass using a pure melting process. This means an energy savings during the production process, a much lower emission of the volatile and expensive dopant and a lower chemical attack of the melting aggregate.

Through the sinterability of the green body using the two-step procedure, the shaping process of the finished glass product can be performed at room temperature and can be made near to the stop measure, whereby the losses for touch ups, e.g., sawing, cutting, polishing, are greatly reduced. The glass and the procedure are particularly environmentally friendly not only due to the reduction in the amount of waste with cold refinishing and the energy saving through sintering at low temperature, but above all due to the production of the glass based on water and preferably without toxic components like Cd. Moreover, based on the use of standard chemicals, the glass produced is cost-effective compared to glass produced using the melting route.

In order to improve the quality of the glass, in particular with respect to minimizing the number of bubbles, it can be advantageous to heat the glass not just to its sintering temperature, but to increase the temperature somewhat. This lowers the viscosity of the glass and remaining bubbles can escape from the glass body.

Tables A and C give the sinter temperature as well as the temperature at which remaining bubbles escape from the glass for the examples. This temperature, characterized by the escape of the bubbles, will be called the "refining temperature" in this announcement. It is identical for the named execution examples with $CuInS_2$ doping and $CuInSe_2$ doping.

The glass is produced via a green body in both described procedures.

If the glass is heated to the described "refining temperature," then it is irrelevant for the procedure and the quality of the glass whether this "refining temperature" is reached in one step or whether the glass is first sintered vitreously at a lower sintering temperature and increased to this higher temperature in a second temperature step. Both the one-step as well as the two-step procedure are referred to as "refining procedures" here.

As the temperature values clearly show, the "refining temperature," in accordance with the definition in this announcement for the glass as per this invention, always lies below the production and processing temperatures of commonly produced glass.

The compositions of the different types of glass doped with $CuInS_2$ as well as their sintering or refining temperature is given in Table A. The edge wavelength $\lambda_c$ (at a sample thickness of 3 mm) for each given starting temperature [° C.] and time [h] is also given.

Table A

Compositions and sintering or refining temperatures and $\lambda_c$ for colored glass with $CuInS_2$ doping produced based on the described sintering procedure or "refining procedure"

| Percent by Weight | A1.a | A1.b | A2.a | A2.b | A2.c | A3.a | A3.b | A3.c |
|---|---|---|---|---|---|---|---|---|
| $SiO_2$ | 41.21 | 41.21 | 51.21 | 51.21 | 51.21 | 45.28 | 45.28 | 45.28 |
| $K_2O$ | 25.43 | 25.43 | 18.44 | 18.44 | 18.44 | 22.50 | 22.50 | 22.50 |
| ZnO | 16.48 | 16.48 | 16.39 | 16.39 | 16.39 | 18.11 | 18.11 | 18.11 |
| $B_2O_3$ | 9.81 | 9.81 | 13.77 | 13.77 | 13.77 | 10.78 | 10.78 | 10.78 |
| F | 7.07 | 7.07 | 0.20 | 0.20 | 0.20 | 3.33 | 3.33 | 3.33 |
| $CuInS_2$ | 0.13 | 0.15 | 0.15 | 0.20 | 0.20 | 0.23 | 0.23 | 0.23 |
| T (sinter) [° C.] | 700 | 700 | 900 | 900 | 900 | 850 | 850 | 850 |
| T (refine) [° C.] | 950 | 950 | 1100 | 1100 | 1100 | 1050 | 1050 | 1050 |
| λ [nm] | 650 | 700 | 680 | 980 | 990 | 990 | 1020 | 1050 |

-continued

| Percent by Weight | A1.a | A1.b | A2.a | A2.b | A2.c | A3.a | A3.b | A3.c |
|---|---|---|---|---|---|---|---|---|
| Starting Temp. [° C.]/ Start Time [h] | 500/10 | 500/10 | 700/10 | 700/5 | 700/10 | 700/2 | 700/5 | 700/10 |

The compositions of different types of glass doped with CuInSe$_2$ as well as their sintering or refining temperature is given in Table B. The same base glass is indicated with the same number as in Table A. The edge wavelength $\lambda_c$ (at a sample thickness of 3 mm) for each given starting temperature [° C.] and time [h] is also given.

TABLE B

Compositions and sintering or refining temperatures and $\square_c$ for colored glass with CuInSe$_2$ doping produced based on the described sintering procedure or "refining procedure"

| Percent by Weight | B1.a | B1.b | B1.c | B2.a | B4.a |
|---|---|---|---|---|---|
| SiO$_2$ | 41.21 | 41.21 | 41.21 | 51.21 | 48.72 |
| K$_2$O | 25.43 | 25.43 | 25.43 | 18.44 | 21.47 |
| ZnO | 16.48 | 16.48 | 16.48 | 16.39 | 17.40 |
| B$_2$O$_3$ | 9.81 | 9.81 | 9.81 | 13.77 | 6.43 |
| F | 7.07 | 7.07 | 7.07 | 0.20 | 5.97 |
| CuInSe$_2$ | 0.10 | 0.15 | 0.21 | 0.20 | 0.23 |
| T (sinter) [° C.] | 700 | 700 | 700 | 900 | 800 |
| T (refine) [° C.] | 950 | 950 | 950 | 1100 | 1000 |
| $\lambda$ [nm] | 550 | 560 | n.b. | n.b. | 560 |
| Starting Temperature [° C.]/Starting Time [h] | 700/10 | 700/10 | n.b. | n.b. | none |

The composition of the different types of glass doped with CuInS$_2$ and CuInSe$_2$ as well as their sintering or refining temperature are given in Table C. The edge wavelength $\lambda_c$ (at a sample thickness of 3 mm) for each given starting temperature [° C.] and time [h] is also given.

TABLE C

Compositions and sintering or refining temperatures and $\lambda_c$ for a colored glass with CuInS$_2$ and CuInSe$_2$ doping produced based on the described sintering procedure or "refining procedure."

| Percent by Weight | C4a |
|---|---|
| SiO$_2$ | 48.72 |
| K$_2$O | 21.47 |
| ZnO | 17.40 |
| B$_2$O$_3$ | 6.43 |
| F | 5.97 |
| CuInS$_2$ | 0.115 |
| CuInSe$_2$ | 0.115 |
| T (sinter) [° C.] | 800 |
| T (refine) [° C.] | 1000 |
| $\lambda_c$ [nm] | 850 |
| Starting Temperature [° C.]/Starting Time [h] | 700/10 |

The following should be given for example A1b as an example for all other examples of the detailed process for the production of green body to be sintered. The green body for example A1b is produced via a suspension of the following substances in 90 l of water and contains:

| Oxide | Percent by Weight | Raw Material | Weighted-In Quantity (kg) |
|---|---|---|---|
| SiO$_2$ | 41.21 | SiO$_2$ | 36.70 |
| K$_2$O | 25.43 | KOH | 20.18 |
| B$_2$O$_3$ | 9.81 | H$_3$BO$_3$ | 15.60 |
| ZnO | 16.48 | ZnO | 14.68 |
| F | 7.07 | KHF$_2$ | 12.84 |
| CuInS$_2$ | 0.15 | CuInS$_2$ | 0.15 |

The different raw materials KOH, H$_3$BO$_3$, ZnO, KHF$_2$, CuInS$_2$, SiO$_2$ are successively dissolved and dispersed in water by stirring. This creates a pourable suspension that contains all of the components of the later colored glass.

The finished suspension is poured into any casting mould, in which it hardens, and air-dries for 24 hours. After removal from the mould, the green body is dried for another 48 hours at room temperature and subsequently 24 hours at 120° C.

The sintering to the glass occurs at 700° C. and a holding time of I hour. The later start-up process for the formation of the CuInS$_2$ crystallite is performed at 500° C. with a holding time of 10 hours.

The $M^I M^{III} Y^{II}{}_2$ doped glass as per the invention possesses steep absorption edges far onto the IR range, namely to 1.2 $\mu$m. In the stop band, they display a good optical density of $\geq 3$, whereby the optical density is defined as OD $(\lambda)$=1 g $(1/\tau(\lambda))$.

With these cutoff filter properties, they are excellent for use as optical long-pass cutoff filters. They have high chemical resistance. They can be produced at low temperatures. This, in particular, if they, as preferred, are produced using the described sintering and then "refining" procedure. Thus, they can be produced in an environmentally friendly manner. One preferred version, namely, when it is cadmium-free, is particularly harmless to the environment.

What is claimed is:

1. Optical colored glass characterized by a composition (in percent by weight) of

| | |
|---|---|
| SiO$_2$ | 30–75 |
| K$_2$O | 5–35 |
| B$_2$O$_3$ | >4–37 |
| ZnO | 5–37 |
| F | 0.01–10 |
| $M^I M^{III} Y^{II}{}_2$, whereby $M^I = Cu^+$, $Ag^+$ $M^{III} = In^{3+}$, $Ga^{3+}$, $Al^{3+}$ $Y^{II} = S^{2-}$, $Se^{2-}$, $Te^{2-}$. | 0.1–3 |

2. Optical colored glass in accordance with claim 1 characterized by
a composition (in percent by weight) of

| | |
|---|---|
| $SiO_2$ | 30–75 |
| $K_2O$ | 5–35 |
| $TiO_2$ | 0–5 |
| $B_2O_3$ | >4–17 |
| ZnO | 5–30 |
| F | 0.01–10 |
| $M^I M^{III} Y^{II}_2$, whereby $M^I = Cu^+, Ag^+$ $M^{III} = In^{3+}, Ga^{3+}, Al^{3+} Y^{II} = S^{2-}, Se^{2-}, Te^{2-}$. | 0.1–3 |

3. Optical colored glass in accordance with claim 2, characterized by
a composition (in percent by weight) of

| | |
|---|---|
| $SiO_2$ | 40–65 |
| $K_2O$ | 15–29 |
| $B_2O_3$ | 5–16 |
| ZnO | 9–30 |
| F | 0.01–10 |
| $M^I M^{III} Y^{II}_2$, whereby $M^I = Cu^+, Ag^+$ $M^{III} = In^{3+}, Ga^{3+}$ $Y^{II} = S^{2-}, Se^{2-}$. | 0.1–0.3 |

4. Optical colored glass in accordance with claim 1, characterized by
a composition (in percent by weight) of

| | |
|---|---|
| $SiO_2$ | 40–56 |
| $K_2O$ | 17–29 |
| $B_2O_3$ | 8–16 |
| ZnO | 9–23 |
| F | 0.3–10 |
| $M^I M^{III} Y^{II}_2$, whereby $M^I = Cu^+, Ag^+$ $M^{III} = In^{3+}, Ga^{3+}$ $Y^{II} = S^{2-}, Se^{2-}$. | 0.1–0.25 |

5. Optical colored glass in accordance with claim 1, characterized in that
the optical colored glass contains common refining substances in common amounts.

6. Optical colored glass in accordance with claim 5, characterized in that
it also contains (in percent weight based on oxide):

| | |
|---|---|
| $Na_2O$ | 0–20 |
| with $Na_2O + K_2O$ | ≤35 |
| MgO | 0–20 |
| CaO | 0–20 |
| with CaO + MgO | 0–20 |
| $Al_2O_3$ | 0–10 |
| SrO | 0–<10 |
| BaO | 0–<10 |
| $La_2O_3$ | 0–5 |
| $Nb_2O_5$ | 0–5 |
| $Ta_2O_5$ | 0–5 |
| $CeO_2$ | 0–5 |
| $ZrO_2$ | 0–5 |
| $P_2O_5$ | 0–10 | as well as common refining substances in common amounts.

7. Optical colored glass in accordance claim 1, characterized in that
it contains

| | |
|---|---|
| F | 1–10 |
| and MgO + CaO + SrO + BaO | 0–<3. |

8. Optical colored glass in accordance with claim 6, characterized in that
it contains

| | |
|---|---|
| F | 0.01–<1 |
| and MgO + CaO + SrO + BaO | >3. |

9. Optical colored glass in accordance with claim 1, characterized in that
it contains between 0.1 and 0.25 percent by weight of $CuIn(Se_{1-x}S_x)_2$.

10. Optical colored glass in accordance with claim 1, characterized in that
it contains up to at total of 0.5 percent by weight of CdS and/or CdSe.

11. Optical colored glass in accordance with claim 1 with an edge wavelength $\lambda_c$ between 360 nm and 1200 nm.

12. Optical long-pass cutoff filter consisting of a glass in accordance with claim 1.

13. Optical colored glass in accordance with claim 1, characterized by
a composition (in percent by weight) of

| | |
|---|---|
| $SiO_2$ | 40–65 |
| $K_2O$ | 15–29 |
| $B_2O_3$ | 5–16 |
| ZnO | 9–30 |
| F | 0.01–10 |
| $M^I M^{III} Y^{II}_2$, whereby $M^I = Cu^+, Ag^+$ $M^{III} = In^{3+}, Ga^{3+}$ $Y^{II} = S^{2-}, Se^{2-}$. | 0.1–0.3 |

14. Optical colored glass in accordance with claim 2, characterized by
a composition (in percent by weight) of

| | |
|---|---|
| $SiO_2$ | 40–56 |
| $K_2O$ | 17–29 |
| $B_2O_3$ | 8–16 |
| ZnO | 9–23 |
| F | 0.3–10 |
| $M^I M^{III} Y^{II}_2$, whereby $M^I = Cu^+, Ag^+$ $M^{III} = In^{3+}, Ga^{3+}$ $Y^{II} = S^{2-}, Se^{2-}$. | 0.1–0.25 |

15. Optical colored glass in accordance with claim 3, characterized by
a composition (in percent by weight) of

| | |
|---|---|
| $SiO_2$ | 40–56 |
| $K_2O$ | 17–29 |
| $B_2O_3$ | 8–16 |
| ZnO | 9–23 |
| F | 0.3–10 |
| $M^I M^{III} Y_2^{II}$, whereby $M^I$ = $Cu^+$, $Ag^+ M^{III}$ = $In^{3+}$, $Ga^{3+}$ $Y^{II}$ = $S^{2-}$, $Se^{2-}$. | 0.1–0.25 |

16. Optical colored glass in accordance with claim 2, characterized in that
it also contains (in percent weight based on oxide):

| | |
|---|---|
| $Na_2O$ | 0–20 |
| with $Na_2O + K_2O$ | ≦35 |
| MgO | 0–20 |
| CaO | 0–20 |
| with CaO + MgO | 0–20 |
| $Al_2O_3$ | 0–10 |
| SrO | 0–<10 |
| BaO | 0–<10 |
| $La_2O_3$ | 0–5 |
| $Nb_2O_5$ | 0–5 |
| $Ta_2O_5$ | 0–5 |
| $CeO_2$ | 0–5 |
| $ZrO_2$ | 0–5 |
| $P_2O_5$ | 0–10 | as well as common refining substances in common amounts.

17. Optical colored glass in accordance with claim 3, characterized in that
it also contains (in percent weight based on oxide):

| | |
|---|---|
| $Na_2O$ | 0–20 |
| with $Na_2O + K_2O$ | ≦35 |
| MgO | 0–20 |
| CaO | 0–20 |
| with CaO + MgO | 0–20 |
| $Al_2O_3$ | 0–10 |
| SrO | 0–<10 |
| BaO | 0–<10 |
| $La_2O_3$ | 0–5 |
| $Nb_2O_5$ | 0–5 |
| $Ta_2O_5$ | 0–5 |
| $CeO_2$ | 0–5 |
| $ZrO_2$ | 0–5 |
| $P_2O_5$ | 0–10 | as well as common refining substances in common amounts.

18. Optical colored glass in accordance with claim 4, characterized in that
it also contains (in percent weight based on oxide):

| | |
|---|---|
| $Na_2O$ | 0–20 |
| with $Na_2O + K_2O$ | ≦35 |
| MgO | 0–20 |
| CaO | 0–20 |
| with CaO + MgO | 0–20 |
| $Al_2O_3$ | 0–10 |
| SrO | 0–<10 |
| BaO | 0–<10 |
| $La_2O_3$ | 0–5 |
| $Nb_2O_5$ | 0–5 |
| $Ta_2O_5$ | 0–5 |
| $CeO_2$ | 0–5 |
| $ZrO_2$ | 0–5 |
| $P_2O_5$ | 0–10 | as well as common refining substances in common amounts.

19. Optical colored glass in accordance with claim 1, characterized in that
it also contains (in percent weight based on oxide):

| | |
|---|---|
| $Na_2O$ | 0–20 |
| with $Na_2O + K_2O$ | ≦35 |
| MgO | 0–20 |
| CaO | 0–20 |
| with CaO + MgO | 0–20 |
| $Al_2O_3$ | 0–10 |
| SrO | 0–<10 |
| BaO | 0–<10 |
| $La_2O_3$ | 0–5 |
| $Nb_2O_5$ | 0–5 |
| $Ta_2O_5$ | 0–5 |
| $CeO_2$ | 0–5 |
| $ZrO_2$ | 0–5 |
| $P_2O_5$ | 0–10 | as well as common refining substances in common amounts.

* * * * *

UNITED STATES PATENT AND TRADEMARK OFFICE
CERTIFICATE OF CORRECTION

PATENT NO. : 6,667,259 B2
DATED : December 23, 2003
INVENTOR(S) : Rolf Clasen et al.

It is certified that error appears in the above-identified patent and that said Letters Patent is hereby corrected as shown below:

<u>Column 8,</u>
Line 60, after "$B_2O_3$" delete ">4-37" and substitute therefor -- >4-17 --.

Signed and Sealed this

Sixth Day of April, 2004

JON W. DUDAS
*Acting Director of the United States Patent and Trademark Office*